United States Patent Office 3,060,139
Patented Oct. 23, 1962

3,060,139
STABLE POLYVINYL ALKANOATE LATEXES CONTAINING HYDROXYALKYL ALKYL CELLULOSE AND PROCESS FOR PREPARING THE SAME
George K. Greminger, Jr., and Owen L. Stafford, Midland, Mich., assignors to The Dow Chemical Company, Midland, Mich., a corporation of Delaware
No Drawing. Filed Mar. 7, 1960, Ser. No. 12,936
11 Claims. (Cl. 260—17)

This invention relates to improved latexes of polyvinyl alkanoates and copolymers composed predominantly of a vinyl alkanoate. More particularly, it relates to and comprehends the inclusion of certain improved additaments which impart stability to the latexes. In addition, the invention contemplates the process for preparing said improved latexes.

It has been known for some time that vinyl alkanoates, such as vinyl acetate and vinyl propionate, may be homopolymerized or copolymerized with each other or with minor but significant amounts of monoethylenically unsaturated comonomers including, for example, vinyl chloride, vinylidene chloride, acrylonitrile, and the alkyl acrylates and methacrylates. When polymerized in emulsion, the resulting latex has properties indicating utility in the formulation of coating, adhesive, and other like compositions. However, as is well known in the coating art in general and in the use of latexes as coatings in particular, there are numerous requirements and specifications (freeze-thaw stability, mechanical stability, rheology, etc.) that must be met and many considerations (particle size, solids, color, etc.) that must be taken into account in the evaluation of a coating composition. These manifold considerations are known to the skilled worker.

As mentioned, the emulsion polymerization of vinyl acetate is well known. Representative procedures are described in U.S. 2,444,396; U.S. 2,536,470; and British 767,729. Traditionally, such latexes have included the solid polymer phase dispersed in an aqueous continuous phase which contains essentially a surface active agent and a protective colloid. The prior latexes have used a wide variety of hydrophilic gums as the protective colloid. Included among the gums finding wide acceptance are gum arabic and gum tragacanth. Polyvinyl alcohol and hydroxyethyl cellulose have also been well accepted as functional in this capacity. None of the prior known protective colloids, however, have been without some difficulty when the latex was to be used in a given utility. Some of the colloids reduced the electrolyte stability of the latexes. Some caused an increased water sensitivity in the films and other articles prepared from the latex. Still others result in adverse rheological properties such as very high viscosities. Accordingly, it would be desirable to have a latex of a vinyl alkanoate polymeric material having an improved protective colloid system incorporated therein.

It is the principal object of this invention to provide improved latexes of polyvinyl alkanoates and copolymers of a vinyl alkanoate with minor amounts of monoethylenically unsaturated comonomers.

It is a further object to provide such a latex composition having an improved protective colloid system.

It is a still further object to provide a process whereby such improved latex compositions may be prepared.

The above and related objects are achieved with an improved polymer latex composition comprising the aqueous emulsion polymerizate of a monomeric mixture composed predominantly of a vinyl alkanoate having from 2 to 4 carbon atoms in the acid portion and said composition containing as the principal protective colloid a hydroxyalkyl alkyl cellulose ether wherein said hydroxyalkyl substituent contains from 2 to 3 carbon atoms and each alkyl substituent contains from 1 to 2 carbon atoms and having about 19 to 24 percent alkoxyl substitution and from about 4 to 12 percent hydroxyalkoxyl substitution as determined by the analytical methods described in Lemieux and Purves, Canadian J. Research, B–25, 485 (1947), using the method of Samsel and McHard, Ind. Eng. Chem., Anal. Ed., 14, 750 (1942), to determine methoxyl. Said cellulose ether is further characterized in exhibiting a lack of viscosity hysteresis in aqueous solution. The objects are also attained and the invention comprehends the process whereby such latexes are prepared.

The monomeric materials which result in the improved polymers of this invention comprise a predominant amount of a vinyl alkanoate having an acid portion of from 2 to 4 carbon atoms. Thus, the invention contemplates homopolymers of such vinyl alkanoates and copolymers of the vinyl alkanoates with each other or with at least one other monoethylenically unsaturated comonomer. Included within the definition of vinyl alkanoate may be mentioned vinyl acetate, vinyl propionate, and vinyl butyrate. Representative of useful comonomers which may be interpolymerized with the vinyl alkanoate are vinyl chloride, vinylidene chloride, acrylonitrile, di-n-hexyl maleate, dibutyl maleate and other dialkyl esters of maleic and fumaric acid, and vinyl alkyl ethers. Other materials copolymerizable with the vinyl alkanoates and which are operable in the present invention will be apparent to the skilled worker.

The instant invention falls in the area of emulsion polymerization. As is known in this field, the preparation of a polymer latex involves many variables which are, in major part, interdependent upon one another. The invention contemplates the use of the prior known emulsion polymerization procedures and techniques and compositions other than the protective colloid used. For example, it is known that polymer latexes may be prepared by continuous or batchwise emulsion polymerization techniques. In the typical batchwise polymerization, the monomeric materials are dispersed in an aqueous phase containing a free radical polymerization catalyst and an emulsifying agent for the monomers in water. The aqueous phase may also include buffers, accelerators, and similar materials known to the art. Polymerization is initiated and maintained under agitation at an elevated temperature which in the case of the vinyl alkanoates is usually in the range of from about 50° C. to 80° C. until polymerization is substantially complete. After polymerization is completed, it is a frequent practice to incorporate additives, such as additional wetting agents, thickening agents, fillers, dyes, pigments, and the like, which perform particular functions in the latex. Also following polymerization, it is frequently desired to demonomerize the latex by known methods, such as exposing the latex to slightly elevated temperatures while under reduced pressure.

The useful continuous polymerization systems may include in effect a modified batchwise procedure in which the monomers are added continuously or in increments to the polymerizing mass as polymerization proceeds or the monomers, plus one or more of the other ingredients, such as the emulsifier, protective colloid, or catalyst, are so added. Such procedures have found wide utility in copolymerizations where the monomers react with each other at a different rate from what they react with themselves. Such modified techniques are credited with providing a more uniform polymer composition, in achieving more satisfactory polymerization rates, and in providing other benefits than the procedure where all ingredients are initially charged. Continuous polymerization also includes true continuous procedures involving a series of interconnected zones, such as polymerization kettles or continuous coils or the like. The present invention finds utility and operability in all of these known procedures and techniques.

The catalysts that are commonly and traditionally employed in emulsion polymerization are the water-soluble per-compounds and compounds of similar decomposition mechanism. Typical of such compounds are hydrogen peroxide, potassium persulfate, and the like. Small amounts of oil-soluble materials, such as the organic per-oxides, including benzoyl peroxide and lauroyl peroxide, may also be used usually in conjunction with the water soluble catalysts. It is a common practice, when an increased rate of polymerization is desired, to use complex catalysts, such as the so-called redox catalytic systems which may include the use of potassium persulfate in combination with a sulfur-containing reducing agent, such as sodium bisulfite.

The emulsifiers that may be used in the emulsion polymerization of the vinyl alkanoates and copolymers thereof are usually selected from the anionic class of such materials. This class of materials is well known and includes typically the alkyl aryl sulfonates, the alkali metal alkyl sulfates, and others. Representative of useful species are the dioctyl ester of sodium sulfosuccinic acid, sold commercially as Aerosol OT; the dihexyl ester of sodium sulfosuccinic acid, sold commercially as Aerosol MA; disodium N-octadecylsulfosuccinamate, sold commercially as Aerosol 18; the sodium sulfate derivative of 7-ethyl-2-methyl-4-undecenol, sold commercially as Tergitol 7; the alkyl phenol polyethylene glycol ether, sold commercially as Tergitol NPX; and a sulfonated alkyl diphenyl ether, sold commercially as Dowfax 2A1. Other species of useful emulsifying agents will be known. It is frequently desirable to employ mixtures of emulsifying agents. It is also possible to use mixtures of anionic and non-ionic emulsifiers to secure a particular result. For example, in the latex art it is known that the use of non-ionic post-polymerization stabilizers may contribute to the stability of the latex to polyvalent metal ions.

The emulsifier is commonly employed in an amount of from about 1 to 5 percent by weight based on the weight of the monomer. When there is less than one percent used, the stability of the latex, its utility as a coating material, and other properties of the latex suffer adversely. When there is more than about 5 percent employed, there is usually no proportional increase in benefits, and the resulting latex may have such a propensity to foam as to detract from its utility as a coating composition. The optimum amount of emulsifier may be easily determined by simple preliminary experiments.

The protective colloids finding utility in the instant invention are those hydroxyalkyl alkyl cellulose ethers falling within a certain narrowly defined scope. The useful ethers are those having from 2 to 3 carbon atoms in each hydroxyalkyl substituent and from 1 to 2 carbon atoms in each alkyl substituent. Representative of such cellulose ethers are hydroxyethyl methyl cellulose, hydroxypropyl methyl cellulose, hydroxyethyl ethyl cellulose, and hydroxypropyl ethyl cellulose. Because of its availability and its unusually good community of properties hydroxypropyl methyl cellulose is preferred. Such ethers are described in the copending application, U.S. Serial No. 581,384, filed April 30, 1956, by Albert B. Savage, now U.S. 2,949,452, issued August 16, 1960. In that application it is pointed out that when cellulose is etherified as described therein to give a mixed cellulose ether containing about 19 to 24 percent alkoxyl substitution and from about 4 to 12 percent hydroxyalkoxyl substitution there results an ether which is characterized by gelation temperatures which are substantially higher than those gelation temperatures of cellulose ethers having the same substituents but in different proportions. Also, these ethers are additionally characterized by a lack of viscosity hysteresis in aqueous solution. It is only the ethers as defined above which are capable of functioning in the stated capacity of a protective colloid for the herein claimed polymer latexes and, at the same time, not detract from the utility of the latexes as coating compositions. For example, a hydroxypropyl methylcellulose having the above composition has been found to satisfy the requisite considerations of a useful protective colloid. Another hydroxypropyl methylcellulose but containing from 27 to 28 percent methoxyl substitution and 6 to 7 percent hydroxypropoxyl substitution was unsatisfactory in an identical comparison. Still further, another commercially sold hydroxypropyl methylcellulose containing 28 to 29 percent methoxyl and from 8 to 9 percent hydroxypropoxyl substitution failed as a protective colloid. It has been found that these comparative cellulose ethers usually provide erratic results, cause precoagulation of the latex even during polymerization or result in a grainy unsatisfactory film when the latex is cast onto a substratum and dried.

The amount of hydroxyalkyl alkyl cellulose ether that may be employed in the instant latexes may be varied within reasonably wide limits. Thus, the amount will depend to some extent on the viscosity type of cellulose ether, on the particular choice of monomers, on the particular polymerization conditions, and on the desired result. The optimum concentration in any instance may be determined by simple preliminary experiments. As a general guide, it has been found that satisfactory results are obtained when the herein claimed protective colloid is used in an amount of from about 0.5 to 3 percent by weight based on the total weight of ingredients charged into the polymerization vessel. However, it may be found that under special conditions more or less of the cellulose ether will be useful.

Mixed cellulose ethers, such as those contemplated in the present invention, are sold according to viscosity grade. By viscosity grade is meant the viscosity in centipoises of a 2 percent aqueous solution of the cellulose ether measured at 20° C. It has been found that any of the available viscosity grades are operable in the instant invention. Thus, cellulose ethers having viscosities of 10 centipoises up to 4,000 and higher centipoises may be used. It is also possible to use mixtures and combinations of viscosity grades. As a practical matter, it is most convenient if the medium or low viscosity grades of cellulose ether are employed and accordingly these viscosity grades are preferred. By medium viscosity it is meant to include those cellulose ethers having an aqueous viscosity of from about 50 to 200 centipoises and by low viscosity those of from 10 to 50 centipoise viscosity grade. It should be apparent that with the very low viscosity grades the amount of cellulose ether employed may be somewhat greater than when the high viscosity grades are used. The very high viscosity grades are difficult to dissolve in water and frequently cause an undesirable increase in latex viscosity. From the viewpoints of ease of dissolution, operability, and end results it is the aforementioned medium grades which are most successful.

The protective colloid is functional during polymerization and following polymerization. Consequently, the protective colloid is usually added to the initially formed dispersion prior to any polymerization. However, in those procedures whereby an initial increment of monomer is charged, it has been found that the protective colloid of this invention may be added after polymerization of that initial increment without adverse effect. To secure the benefits of this invention, however, it is necessary that the protective colloid be present in the polymerization system prior to the occurrence of substantial polymerization of say about 25 percent conversion of monomer to polymer. When added later, the cellulose ether may be functional as a latex thickener and benefits may derive therefrom, but these benefits do not depend on the function of the protective colloid.

As is known in the cellulose ether art, mixed cellulose ethers are difficult to dissolve. For this reason it is preferred to form an aqueous solution of protective colloid which is then added to the emulsion polymerization system. A preferred technique for dissolving cellulose ethers involves wetting the cellulose ether with hot water, allowing the wet ether to cool to about room temperature where dissolution should then occur readily.

For coating compositions it is desirable to have latexes having polymer solids within the range of from about 20 to 55 percent by weight. When there is significantly less than about 20 percent solids, it is difficult to attain continuous coherent films by simple deposition and drying. Furthermore, latexes having appreciably less than about 20 percent solids are uneconomical to prepare. Latexes containing appreciably more than 55 percent solids are difficult to prepare and when made are likely to be unduly sensitive to mechanical shearing forces. However, the present invention is not limited to any given amount of solids content.

The film formability of latexes is also known to be a function of particle size. The hydroxyalkyl alkyl cellulose ethers of this invention, however, are for most part operable with equal efficiency regardless of the particle size of the latex.

The rheological properties of a latex frequently are of prime significance in the performance of that latex in a given utility. For example, in the formulation of latex paints it is known that the rheology of the latex vehicle affects the brushability, leveling, and the like. For adhesive compositions the latex should have a viscosity in the range of about 4,000 to 6,000 centipoises when measured with a Brookfield viscosimeter at 30 r.p.m. spindle speed at room temperature. Still further, this viscosity must remain within the desired range for prolonged periods. With the prior cellulose ethers it was virtually impossible to attain the desired viscosities. The viscosities with those ethers were almost without exception prohibitively high. With the protective colloids of the present invention, however, the viscosities desired for coating and adhesive compositions are readily attained and, in addition, the viscosities remain stable for long periods of time.

The latexes of this invention may be formulated with the conventional and common adidtives, such as pigments, dyes, fillers, stabilizers, preservatives, and the like, which are commonly added in paints, adhesives, and similar compositions. In addition, the latexes may be blended with other known latexes, if desired.

The advantages and benefits realized with the present invention will be more apparent from the following illustrative examples wherein all parts and percentages are by weight unless otherwise stated.

*Example 1*

Into a polymerization vessel was placed an aqueous phase containing 1 percent based on the total charge of a water-soluble protective colloid, 0.8 percent based on total charge of an emulsifier, 0.15 percent of sodium bicarbonate as a buffer, and potassium persulfate as a part of the catalyst to be used. The dispersion was agitated and about 15 percent of the total vinyl acetate to be used was added. This first increment of monomer contained a small amount of benzoyl peroxide as additional catalyst. The temperature of the dispersion was elevated to about 70° C. The remaining 85 percent of the vinyl acetate was added at a rate to maintain the temperature at about 70° C. After the monomer addition had been completed, the temperature was raised to about 75° C. for 30 minutes and the resulting mixture then cooled. Agitation was maintained until the latex had cooled to room temperature.

In the compositions listed below, those designated as A, B, and C employed as the protective colloid a water-soluble methyl hydroxypropyl cellulose ether having about 22 perecnt alkoxyl substitution and about 6 percent hydroxyalkoxy substitution in accordance with this invention. This cellulose ether will be hereinafter referred to as 90HG. Composition D employed a water-soluble methyl hydroxypropyl cellulose ether outside of the purview of this invention and having about 27 to 29 percent methoxyl substitution and about 5.5 to 7.5 percent hydroxypropoxyl substitution. This cellulose ether will hereinafter be referred to as 65HG. Composition E employed a water-soluble methyl hydroxypropyl cellulose ether having about 28 to 30 percent methoxyl substitution and about 7 to 12 percent hydroxypropoxyl substitution. This cellulose ether which was also outside of the purview of this invention will hereinafter be referred to as 60HG. Composition F employed a water-soluble methyl cellulose ether and will be referred to hereinafter as MC. The Compositions A–C, inclusive, are illustrative of the present invention while Compositions D–F, inclusive, are for purposes of contrast.

The cellulose ethers of Compositions A, B and D were of 100 centipoise viscosity grade; Composition C of 6.6 centipoise viscosity grade; Composition E of 50 centipoise; and Composition F of 5.3 centipoise viscosity grade.

Compositions A, C, and D employed as the emulsifier a dioctyl sulfosuccinate sold commercially as Aerosol OT by the American Cyanamid Company. Composition B employed as the emulsifier Dowfax-2A1, a sulfonated alkyl diphenyl ether having an average of 1–1.3 alkyl substituents having from 9–15 carbon atoms and having 1.8–2.3 sulfonate groups prepared in accordance with U.S. Patent 2,854,477. Compositions C and F employed as the emulsifier an alkyl aryl sodium sulfonate sold commercially as Santomerse SX by the Monsanto Chemical Company.

The catalyst employed in each run was a combination of 1 part benzoyl peroxide to 2 parts potassium persulfate with a total amount of catalyst employed being about 0.3 percent based on the weight of the monomer.

The monomer was charged to a percentage of about 55 percent of the total composition.

Following polymerization, the percent solids of the latex were determined by evaporating the continuous aqueous phase. The viscosity of the latex was determined with a Brookfield viscosimeter at 30 r.p.m. Particle size was also measured using a microscope. Films were cast on glass plates and dried. The character of the film was then noted as to clarity and as to smoothness or lack of graininess. The results are summarized in the table below.

| Composition | Cellulose ether | Percent solids (by weight) | Viscosity (centipoises) | Particle size (microns) | Cast film |
|---|---|---|---|---|---|
| A | 90HG | 55.2 | 7,080 | 1 | clear, smooth. |
| B | 90HG | 55.3 | 6,640 | 1 | Do. |
| C | 90HG | 47.9 | 910 | 1 | slightly cloudy, smooth. |
| Comparison: | | | | | |
| D | 65HG | 55.5 | 11,200 | 2 | cloudy, grainy. |
| E | 60HG | 57.6 | 14,220 | 1–10 | Do. |
| F | MC | 54.7 | 180 | 15 | very cloudy and grainy. |

Similar results to those of Compositions A to C above were observed when the 90HG was replaced by other viscosity grades of the same ether.

*Example 2*

The procedure used in preparing Composition A of Example 1 was repeated employing a monomeric mixture composed of 75 percent vinyl acetate and 25 percent di-n-hexyl maleate. Following polymerization, it was found that the latex had a viscosity of 9,260 centipoises and a particle size in the range of 0.5 to 3 microns.

*Example 3*

The procedure used in preparing Composition A of Example 1 was repeated employing a monomeric mixture composed of 80 percent vinyl acetate and 20 percent ethyl acrylate. Following polymerization, the latex was found to have a viscosity of 3,080 centipoises and a particle size in the range of 1 to 3 microns.

Similar results are observed when the vinyl acetate of Example 3 is replaced by vinyl propionate or with vinyl butyrate.

Each of the latexes prepared in Examples 1–3 was subjected to a stability test wherein 10 milliliters of warm 10 or 20 percent aqueous borax solution are added to the latex and the viscosity followed with time. Similar latexes prepared with hydroxyethyl cellulose and with polyvinyl alcohol were used for comparison. It was found that the latexes prepared in accordance with this invention were equivalent to hydroxylethyl cellulose and were more stable than those of Compositions D–F of Example 1 or of polyvinyl alcohol.

In addition, the latexes of Compositions A–C of Example 1 were formulated into latex paints to a pigment volume concentration ($TiO_2$) of 40 percent using a known recipe. The so-formed paints were found to have excellent leveling properties, good open time, and moderate to heavy brush drag. The paint films laid down showed excellent scrub resistance when tested with a Gardner straight line washability and abrasion machine.

From the above results, as well as others, it can be seen that hydroxyalkyl cellulose ethers, as earlier defined, function effectively and efficiently as protective colloids in the preparation of the aqueous emulsion polymerizates of polyvinyl alkanoates having from 2 to 4 carbon atoms in the acid portion and of copolymers and terpolymers of such vinyl alkanoates with other monoethylenically unsaturated comonomers, including typically vinyl chloride, acrylonitrile, ethyl acrylate, and n-hexyl maleate. The latexes so prepared are ideally suited as vehicles for latex paints, as adhesive compositions, and in other known utilities.

What is claimed is:

1. An improved polymer latex composition comprising the aqueous emulsion polymerizate of a monomeric material composed of at least 50 percent by weight of a vinyl alkanoate having from 2 to 4 carbon atoms in the acid portion with any remainder of at least one monethylenically unsaturated comonomer and containing as the principal protective colloid a hydroxyalkyl alkyl cellulose ether having from 2 to 3 carbon atoms in each hydroxyalkyl substituent and from 1 to 2 carbon atoms in each alkyl substituent and also having about 19 to 24 percent alkoxyl substitution and about 4 to 12 percent hydroxyalkoxyl substitution, said hydroxyalkyl alkyl cellulose ether being further characterized by a lack of viscosity hysteresis in aqueous solution.

2. The latex composition claimed in claim 1 wherein said hydroxyalkyl alkyl cellulose ether is a hydroxypropyl methylcellulose.

3. The latex composition claimed in claim 1 wherein said hydroxyalkyl alkyl cellulose ether is present in said composition in an amount of from about 0.5 to 3 percent by weight based on the total weight of the ingredients charged.

4. The latex composition claimed in claim 1 wherein said emulsion polymerizate is an aqueous latex of polyvinyl acetate.

5. The latex composition claimed in claim 1 wherein said emulsion polymerizate is an aqueous latex of an interpolymer of vinyl acetate and at least one monoethylenically unsaturated comonomer.

6. The latex composition claimed in claim 1 wherein said aqueous emulsion polymerizate contains from about 20 to about 55 percent of polymer solids.

7. In the process for emulsion polymerizing vinyl alkanoates wherein a monomeric material composed of at least 50 percent by weight of a vinyl alkanoate having from 2 to 4 carbon atoms in the acid portion with any remainder of at least one monoethylenically unsaturated monomer is dispersed in an aqueous phase containing a free radical polymerization catalyst and an emulsifying agent and polymerization is induced at an elevated temperature while the dispersion is agitated, the improvement comprising the addition to said dispersion before about 25 percent by weight of said monomeric material has polymerized of a protective colloid composed principally of a water-soluble hydroxyalkyl alkyl cellulose ether having from 2 to 3 carbon atoms in each hydroxyalkyl substituent and from 1 to 2 carbon atoms in each alkyl substituent and also having about 18 to 24 percent alkoxyl substitution and about 4 to 12 percent hydroxyalkoxyl substitution and being further characterized by a lack of viscosity hysteresis in aqueous solution.

8. The process claimed in claim 7 wherein the polymerization is conducted at a temperature of from about 50° C. to about 80° C.

9. The process claimed in claim 7 wherein said vinyl alkanoate is vinyl acetate.

10. The process claimed in claim 7 wherein said water-soluble hydroxyalkyl alkyl cellulose ether is hydroxypropyl methylcellulose.

11. The process claimed in claim 10 wherein said hydroxypropyl methylcellulose is employed in a concentration of from about 0.5 to 3.0 percent by weight of said monomeric material.

References Cited in the file of this patent

UNITED STATES PATENTS

| | | |
|---|---|---|
| 2,538,051 | Schick | Jan. 16, 1951 |
| 2,892,802 | Budewitz | June 30, 1959 |
| 2,949,452 | Savage | Aug. 16, 1960 |